United States Patent [19]

Hori

[11] Patent Number: 4,630,075

[45] Date of Patent: Dec. 16, 1986

[54] CASSETTE-TYPE PRINTING HEAD

[75] Inventor: Keiichi Hori, Tokyo, Japan

[73] Assignee: Elm Co. Ltd., Tokyo, Japan

[21] Appl. No.: 732,172

[22] Filed: May 7, 1985

[30] Foreign Application Priority Data

May 29, 1984 [JP] Japan ................................ 59-107544

[51] Int. Cl.[4] .............................................. G01D 15/18

[52] U.S. Cl. ................................ 346/140 R; 400/126; 400/202.2

[58] Field of Search ........................... 346/140, 75, 21; 400/126, 208, 202.2–202.4

[56] References Cited

U.S. PATENT DOCUMENTS

| | | | |
|---|---|---|---|
| 3,655,379 | 4/1972 | Gundlach | 346/140 X |
| 3,719,261 | 3/1973 | Heinzer | 346/140 X |
| 3,834,301 | 9/1974 | Croquelois | 400/126 X |
| 4,308,547 | 12/1981 | Lovelady | 346/140 X |
| 4,366,487 | 12/1982 | Willett | 346/140 X |
| 4,490,728 | 12/1984 | Vaught | 346/140 X |
| 4,540,996 | 9/1985 | Saito | 346/140 |

*Primary Examiner*—Joseph W. Hartary

*Attorney, Agent, or Firm*—Cislo, O'Reilly & Thomas

[57] ABSTRACT

At least one pulley member which is rotatably positioned in said casing member; a film member which is movably contacted with a heating surface of a thermal head and is movably guided by said pulley in said casing member; a plurality of small holes which is shaped to said film member; a recording ink which is stored in said casing member; said pulley and film members are immersed in said recording ink; said recording ink is housed in said small holes; said recording ink in said small holes of said film member is moved to a corresponded position to a heating surface of said thermal head by rotating said pulley member and moving said film member according to a rotation of said pulley member.

13 Claims, 14 Drawing Figures

CASSETTE-TYPE PRINTING HEAD

BACKGROUND OF THE INVENTION

The present invention relates to a cassette-type printing head, particularly to a cassette-type printing head for printing by jetting an ink which is housed in a plurality of holes or recesses and which are shaped in a film member by a bubble pressure of the heat from a thermal head.

In the conventional ink jet typed printer, a plurality of ink jet nozzles are used, and said ink is jetted to a printing paper by a piezo electric driving means.

SUMMARY OF THE INVENTION

The aforementioned conventional type, there are many insufficient matters, i.e. in case of an ink jet system, it is very difficult to eliminate a nozzle stoppage, whereby a white point is printed on a printing paper by said nozzle stoppage. On the other hand, in case of an ink ribbon type, ink is disappeared according to time elapsed, a printed density became paler by printing a several reciprocation operation. Further, in case of thermal transfer or hammer type, a coated tape must be abandoned after one printing operation. Therefore, a printer or typewriter and word processor which be able to print by supplying an ink continuously was not developed until now.

The present invention aims to eliminate the above noted difficulty and insufficiency; the object of the present invention is to provide a new cassette-type printing head which is composed of at least one pulley which is rotatably mounted in a casing, a film member which is movably mounted and guided by said pulley in said casing and is contacted with a heating surface of a thermal head, a plurality of small holes or recesses to said film member, and a recording ink is stored in said casing.

BRIEF DESCRIPTION OF THE DRAWINGS

FIG. 1 shows a cross sectional view of a cassette printing head.

FIG. 2 shows a flat plan view of one part of a film.

FIG. 3 shows a cross sectional view of a cassette printing head in FIG. 1.

FIG. 4 shows a perspective view of a cassette printing head of serial color printer.

FIG. 5 shows a cross sectional view of endless type of said cassette printing head as another embodiment of the present invention.

FIG. 6 shows a cross sectional view of line printer as another embodiment of the present invention.

FIG. 7 shows a perspective view of FIG. 6.

FIG. 8 shows a front view of line color printer.

FIG. 9 shows an enlarged cross sectional view of a principal construction.

FIG. 10 shows a perspective view of a wholly construction of a printing head.

FIG. 11 shows a front cross sectional view of ink cassette.

FIG. 12 shows a side cross sectional view of ink cassette.

DESCRIPTION OF THE PREFERRED EMBODIMENTS

Figure 1:
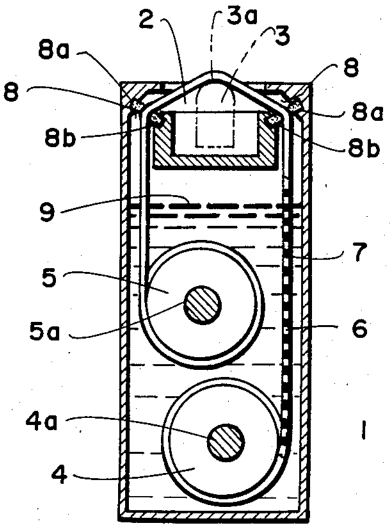
FIGS. 1 to 9 show a first embodiment of the present invention.

Referring now to a first embodiment of the present invention accompanying the drawings in which;

FIG. 1 shows a cross sectional view of a cassette-type printing head, a casing 1 such as a box is detachably mounted to a main body of a printing machine (not shown), an opened recess portion 2 is shaped to a top portion of said casing member 1, a thermal head 3 as shown by a dotted line is guided into said opened recess portion 2 when said casing 1 is mounted to said main body (not shown), a pair of first and second pulleys 4 and 5 are rotatably mounted in said casing 1.

Figure 2:
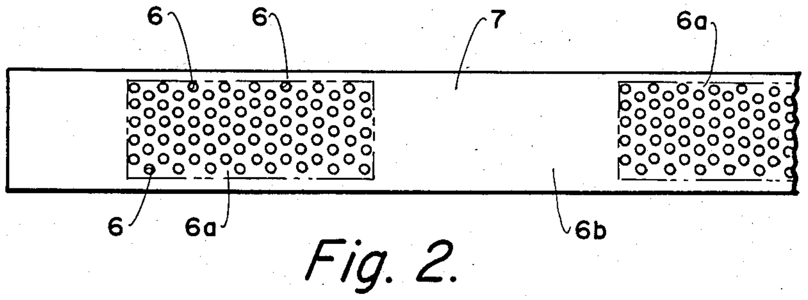

A flexible film member 7 which has a plurality of holes (diameter is about $10 \approx 200$ μm) as shown in FIG. 2 and be made of a metal or organic material, i.e. for example flexible polyimide film is rotatably mounted between said first and second pulleys 4 and 5, said film 7 is movably mounted via a pair of guiding members 8 which are positioned in neighbourhood of said opened recess portion 2. Said guiding members 8 are composed of a pair of guide elements 8*a* and 8*b* which are made of felt material respectively, unnecessary liquid ink 9 except for necessary ink in said small holes 6 is eliminated. A plurality of small hole groups 6*a* which having many small holes 6 are shaped in a certain length direction of said film 7 and intermittently shaped in a length direction of said film 7, whereby non-small hole portion 6*b* and said small hole group 6*a* are alternatively shaped, said non-small hole portion 6*b* is contacted with a heating surface of said thermal head 3 by moving it by said pulleys 4 and 5, said small hole group 6*a* is immersed in said liquid ink in said casing member 1 whereby dry condition of said ink 9 in said small hole is protected. Further, as another embodiment of the present invention not shown as the drawings, said small holes are wholly shaped to said film member 7, it is able to use this type film member 7 by always rotating it by said pulleys 4 and 5.

Figure 3:
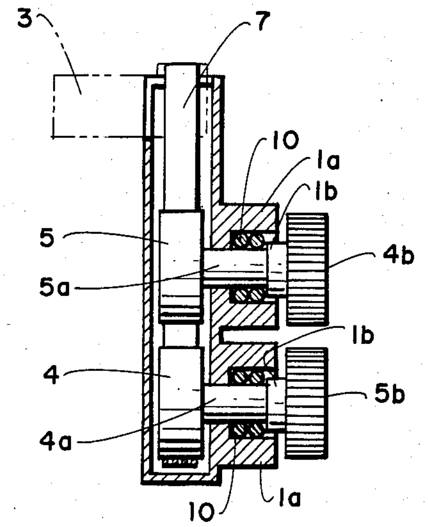

The axial portions 4*a* and 5*a* of said pulleys 4 and 5 are, as shown in FIG. 3, protruded in a bearing portion 1*b* of a mounting portion 1*a* which is shaped in one face of said casing member 1 as one body, a pair of driving disk which are connected to a driving means (not shown) are mounted to the outer portion of said axial portions 4*a* and 5*a*, further, an O-ring member 10 is positioned between said mounting portion 1*a* and said axial portions 4*a* and 5*a*, whereby an ink 9 resistance effect and a braking effect for over running of said axial portions 4*a* and 5*a* are performed.

Figure 4:
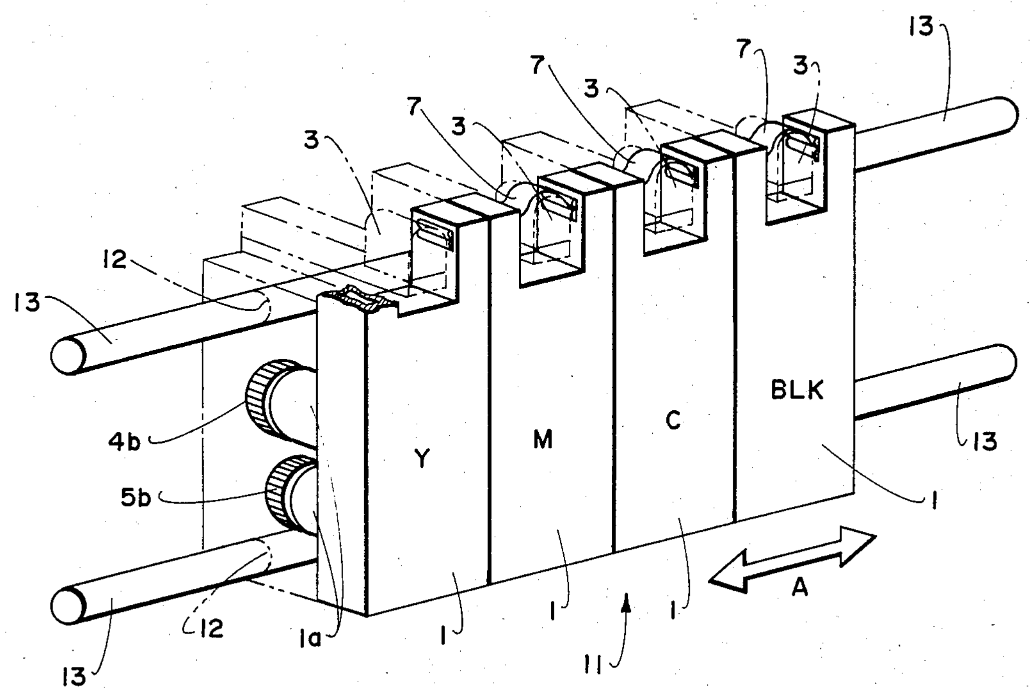

FIG. 4 shows a color printing head block 11 which is composed of four cassette casing members 1 for Y color (Yellow), M color (Magenta), C color (Cyanide) and BLK color (Black) as shown in FIG. 4, said casing members 1 are shaped as one body in a length direction of said film member movement direction. A pair of guide bars 13 are slidably passed through a pair of guide holes 12 which be shaped to said bearing portions 1*b* of said casing members 1, said color printing head block 11 is reciprocally moved according to said guide bars 13, whereby a cassette-type serial color printing head for a serial color printing system are attained. In case of changing said color printing head block 11, it is able to change it by pulling said casing members 1 toward front direction whereby said casing members 1 is fed from a lock mechanism (not shown).

Figure 5:
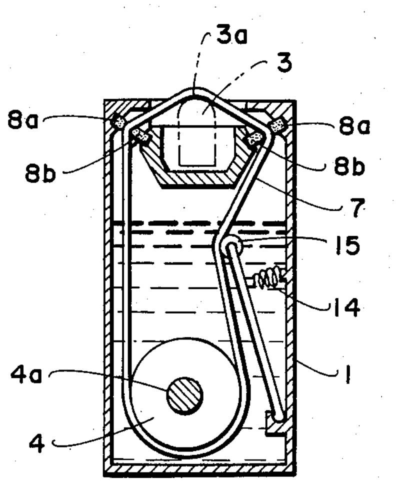

FIG. 5 shows an another embodiment of the present invention, only one pulley 4 is rotatably mounted in said casing member 1, an axial portion 4a is rotatably driven by a driving means (not shown), an endless type film member 7 is slidably connected with said heating surface 3a (thermal dot elements) of said thermal head 3, a part of said film member 7 is spread by a tension roller 15 which is mounted to an inner wall of said casing member 1 via a spring member 14. Namely, in the embodiment of FIG. 5, the small holes of said film member 7 are repeatedly used for printing.

Figure 6:
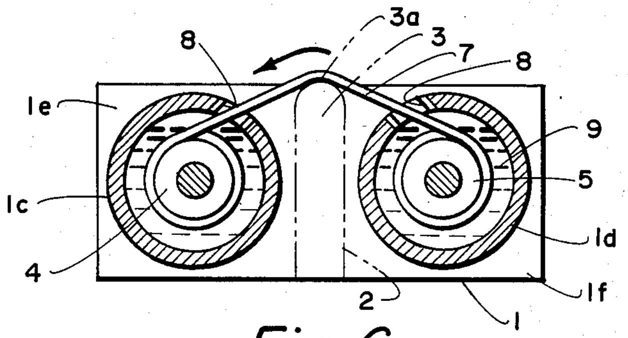
Figure 7:
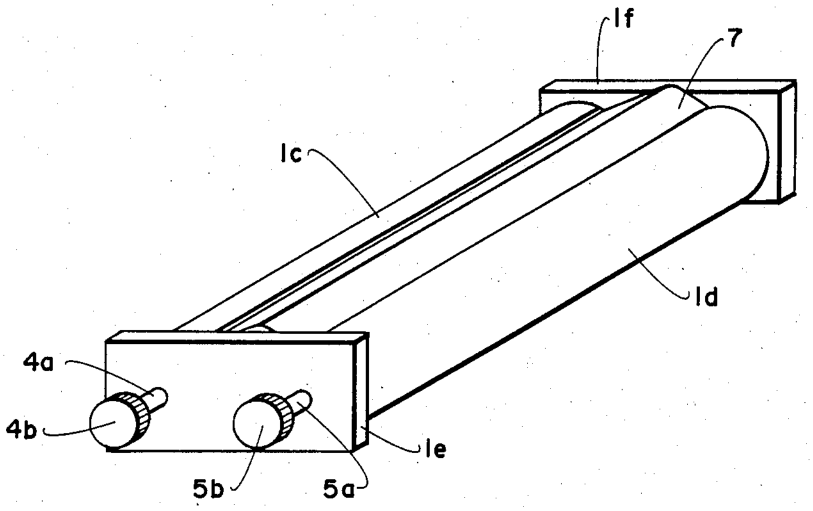

FIG. 6 shows the another embodiment of the present invention, particularly shows a cassette printing head for a line printing system, said casing member 1 is composed of a pair of cylinder members 1c and 1d of which a length is almost the same as a width of a printing paper and a pair of plate members 1e and 1f which are contacted with side portions of said plate members 1e and 1f whereby an inner portion thereof is sealed. Said liquid ink 9 is housed in a cavity of said cylinder members 1c and 1d, said pulleys 4 and 5 are rotatably mounted thereto, said film member 7 which having a plurality of small holes and is rotatably mounted to said pulleys 4 and 5 is guided from a gap portion of a guide member 8 toward outer portion of said cylinder members 1c and 1d. One surface of said film member 7 is contacted with said heating surface 3a of said thermal head 3 which is guided in said opened recess portion between said cylinder members 1c and 1d. Further, said pulleys 4 and 5 have said axis portions 4a and 5a and said driving disks 4b and 5b respectively as one body as shown in FIG. 7. Therefore, the embodiments of FIGS. 6 and 7 show line printing cassette head as one color.

Figure 8:
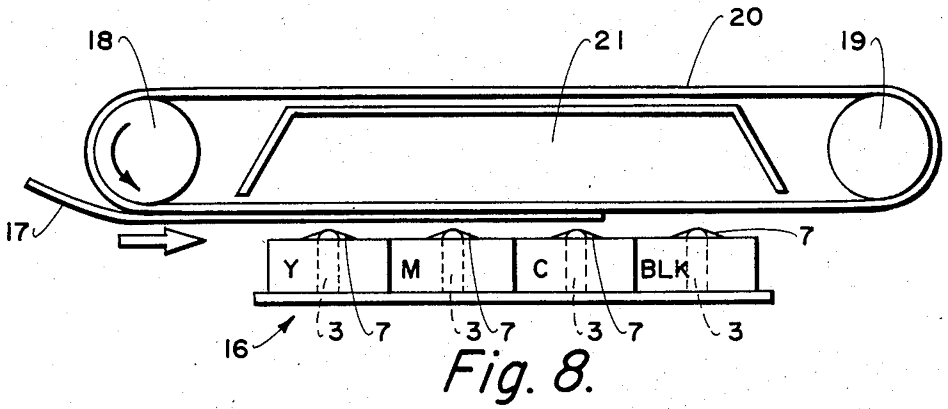
Figure 9:
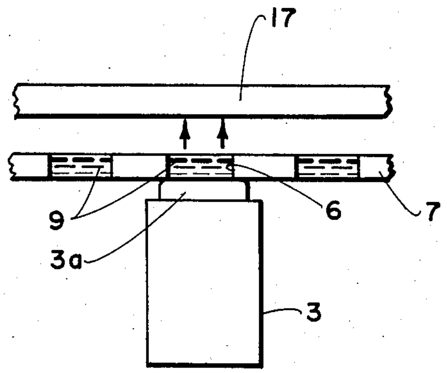

Further, the embodiment of FIG. 8 shows line color printing head which having four cassette printing heads of Y, M, C and BLK colors, said cassette printing heads are set toward the same as a moving direction of said film member 7 whereby a line cassette head block 16 is constructed. Therefore, a recording paper 17 is slidably moved on said line cassette head block 16 by a belt which having a plurality of holes which is moved by a pair of pulleys 18 and 19, said recording paper 17 is tightly contacted with said belt 20 by a vacuum means 21.

The above noted cassette printing head is easily detachably mounted to a printing machine (not shown), said thermal head 3 is guided in said opened recess portion 2 of said casing member 1 whereby said casing member 1 and thermal head 3 are constructed as one body, said ink 9 in said small holes 6 of said film member 7 is jetted on the recording paper 17 by a bubble pressure when said heating surface 3a of said thermal head 3 is actuated.

Referring now to a second embodiment of the present invention accompanying drawings FIG. 10 to FIG. 13;

Numeral 1 shows a boxy casing member in which an ink 2 is housed therein, and a pair of pulleys 4 and 5 are rotatably disposed in said casing member 1.

Figure 12:
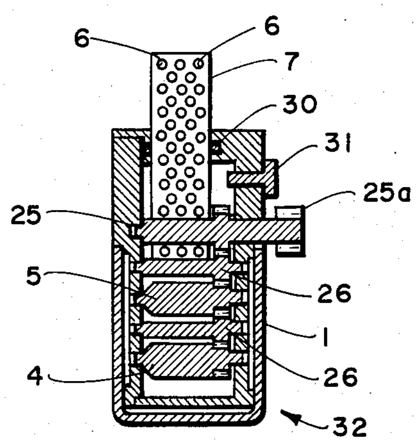
Figure 13A:
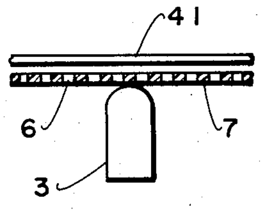
FIG. 13A and B shows a side cross sectional view and flat plan view of a printing principal.
Figure 13B:
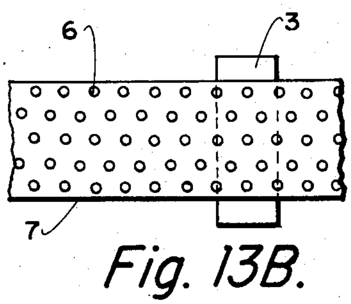

The end portions of a film 7 which is composed of a thin metal or resin material such as polyimide are connected to said pulleys 4 and 5, a plurality of small holes or recesses 6 as shown in FIGS. 12 and 13 are shaped in said film 7, said small holes or recesses 6 is about $10 \approx 200\mu$diameter and composes one picture element.

A driving axis 25 is rotatably disposed on the upper portion of said pulleys 4 and 5 in said casing member 1, one terminal of said driving axis 7 protrudes toward outside of said casing member 1 and has a gear portion 25a. A pair of idlers 26 are rotatably disposed between said pulleys 4 and 5 and between said pulley 5 and driving axis 7 and are geared with said pulleys 4 and 5 and said driving axis 7. Said pulleys 4 and 5 and film 7 are rotated toward same direction by said idlers 8. Further it is able to rotate said pulleys 5 and film 7 by a pressure contact therebetween except said gear connection.

One end portion of said film 7 is protruded from an opened portion 27 which is shaped to an upper portion of said casing member 1, said film 7 is placed between a sealing member 30 and protrusions 29 of a plug 28 whereby ink is not emerged from said casing member 1. An ink filling plug 31 is detachably disposed to a side portion of said casing member 1, it is able to fill ink into said casing member 1 when an ink level becomes lower.

Figure 10:
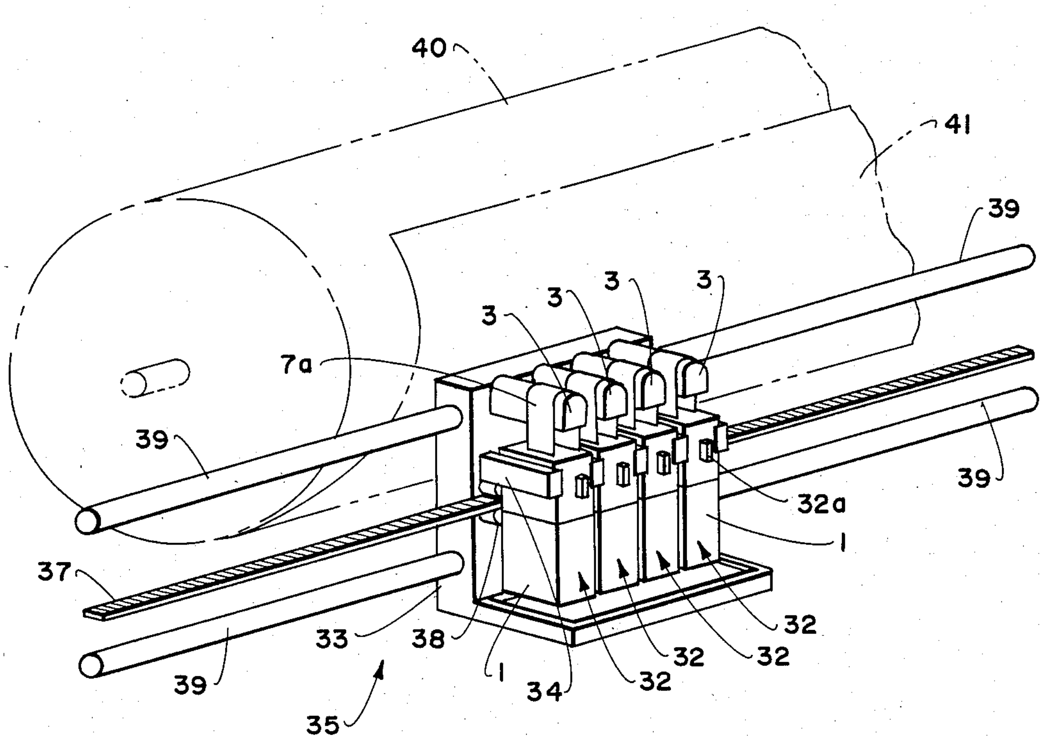
FIGS. 10 to 13 show a second embodiment of the present invention.
Figure 11:
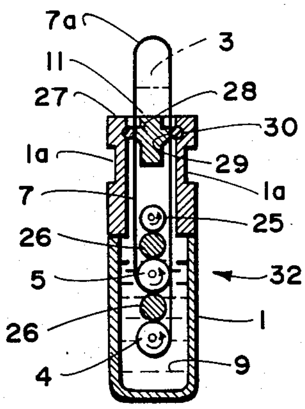

FIG. 10 shows a printer head 33 in which an ink cassette 32 is detachably attached thereto, a supporting recess portion 1a of said casing member 1a is mounted to a supporting arm 16 of said printer head 33, it is able to separate said ink cassette 32 from said printer head 33 by openning said supporting arm 32 and pulling a knob 32a by hand. A thermal head 3 is mounted to said printer head 33, four ink cassettes 32 for four colors Y, M, C and B are disposed, an exposed portion 7a of said film 7 is contacted with an outside surface of said thermal head 3. Each of gear members 25a of said ink cassette 14 are connected with a timing belt 37 of a printer body 18 and are pressed by a supplemental pulley 20 which is mounted to a printer head 33.

Said printer head 33 is reciprocally disposed to a pair of guiding bars 39 of said printer body 35, said driving axis 25 of said ink cassette 32 is rotated by said timing belt 37, then it is able to print on a paper 41 of a platin 40.

An ink material 2 in said holes or recesses 6 are jetted to said paper 41 by a bubble pressure of a heat of a thermal head.

According to the present invention, when a life of said ink had come, it is able to only change a cassette having film except said thermal head whereby enabling to constantly print a mono or color printing.

Further it is able to constantly print it by moving said film during printing operation, thereby a stoppage of said holes or recesses are completely prevented.

Furthermore it is able to constantly print it by a constant density.

What is claimed is:

1. A cassette-type printing head comprising in combination: a casing member; at least one pulley member which is rotatably positioned in said casing member; a film member which is movably contacted with a heating surface of a thermal head and which is movably guided by said pulley in said casing member, with portions of said film member being provided with a plurality of small holes; a recording ink which is stored in said casing member, with said pulley and film member immersed in said recording ink, said small holes of said film member adapted to accept ink therein; said pulley adaped to move said film member with its ink-filled holes across said heating surface of said thermal head; said heating surface of said thermal head adapted to jet bubbles of said ink in said holes of said film member onto a recording medium.

2. A cassette-type printing head as claimed in claim 1, further comprising an opened recess portion guiding said thermal head and a film guiding member which is positioned in the neighborhood of said opened recess portion.

3. A cassette-type printing head as claimed in claim 1, wherein said casing member is composed of a color printing head block which has a plurality of casing members as one body in a length direction of said film member movement direction, with a plurality of different color inks respectively housed in said casing members for printing a color image.

4. A cassette-type printing head as claimed in said claim 1, said small hole is composed of small holes group portion which is composed of a plurality of small holes in a length direction of said film member, said small holes group portion is intermittently shaped in a length direction of said film member, a non-small holes portion is shaped between said small holes group portions.

5. A cassette-type printing head as claimed in said claim 1, said pulley member is composed of one pulley, said film member is mounted between said pulley, said thermal head and said film guiding member, said film member is composed of an endless type.

6. A cassette-type printing head as claimed in claim 1, a driving disk member which is positioned to an outer portion of said casing member to rotate said pulley member.

7. A cassette-type printing head as claimed in claim 2, said printing head block is slidably mounted by a guide bar member, whereby a serial color printing is performed.

8. A cassette-type printing head as claimed in claim 1, a width of said casing member is almost same width of a recording paper, whereby a line printing is performed.

9. A cassette-type printing head as claimed in claim 1, a pair of pulleys which are housed in said casing member, a film member in which each of end portions are fixed to said pulleys and a part thereof is exposed toward outside of said casing member, a plurality of holes or recesses for housing an ink which are shaped to said film member, an idler which is co-operated with said pulleys, a driving axis which is disposed in said casing member and rotates said pulleys in same direction via said idler, whereby said film member is rotatably moved by rotating said driving axis via said pulleys.

10. A cassette-type printing head as claimed in claim 9, an ink is housed in said casing member.

11. A cassette-type printing head as claimed in claim 9, said idler and pulleys are geared respectively.

12. A cassette-type printing head as claimed in claim 9, a sealing member and a plug member which are mounted to said casing member, said film member are supported and exposed by said sealing member and plug member.

13. A cassette-type printing head as claimed in claim 9, a supporting recess portion is shaped to said casing member.

* * * * *